Jan. 9, 1951 J. A. WILDERMUTH 2,537,612
THERMOMETER HOLDER
Filed Oct. 8, 1945 2 Sheets-Sheet 1

INVENTOR.
James A. Wildermuth
BY
Norman E. H. Pseletzke
Atty.

Jan. 9, 1951  J. A. WILDERMUTH  2,537,612
THERMOMETER HOLDER
Filed Oct. 8, 1945  2 Sheets-Sheet 2
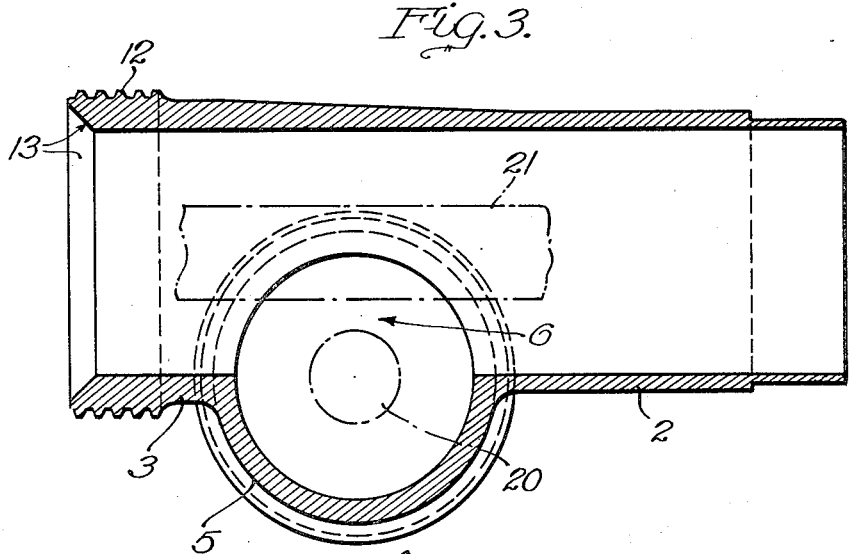
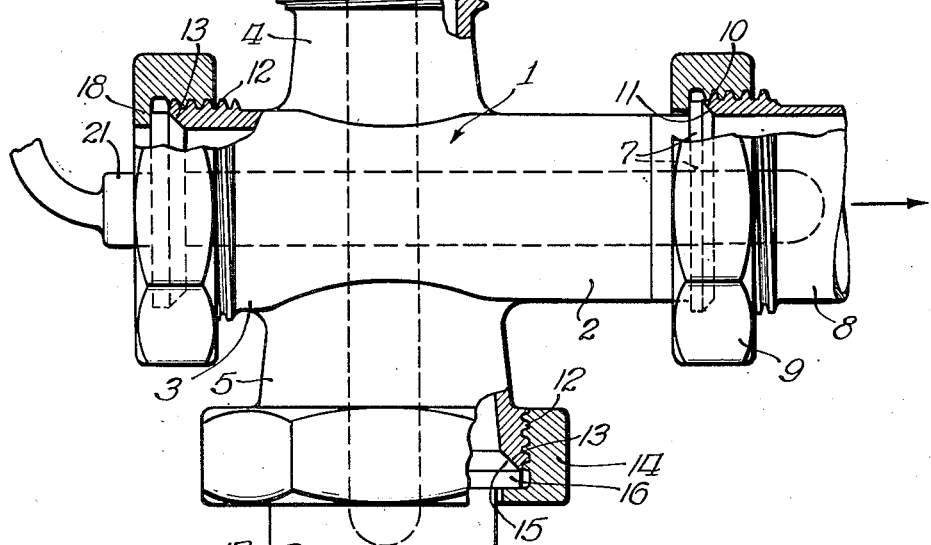
INVENTOR.
James A. Wildermuth
BY
Norman C. H. Welcher
Atty.

Patented Jan. 9, 1951

2,537,612

UNITED STATES PATENT OFFICE 2,537,612

THERMOMETER HOLDER

James A. Wildermuth, Little Falls, N. Y., assignor to Cherry-Burrell Corporation, Chicago, Ill., a corporation Application October 8, 1945, Serial No. 621,100

1 Claim. (Cl. 297—3)

This invention relates to thermometer holders or the like. More particularly, this invention relates to a thermometer holder or the like of the type adapted to form a part of a pipe system or the like, and to hold a plurality of thermometers or thermometer stems in spaced relation and out of contact with each other and with a portion of each thermometer stem extending into the material flowing through the pipe system, of which system the holder forms a part.

Throughout these specifications and the appended claim, the expression "thermometer holder" and like expressions are to be interpreted as including holders not only for holding a thermometer but also holders for stems and sensitive bulbs or similar devices used for the actuation of regulators or controllers, and the expressions "thermometers" or "thermometer stems" are to be interpreted as including such devices as sensitized bulbs and the like whether sensitive to thermal changes, electrical changes and the like when intended for such uses as the actuation of regulators or controllers, etc.

The conventional type of thermometer holder normally used in closed pipe systems, or the like, is usually adapted to hold one thermometer or thermometer stem with the end of the thermometer stem extending into the material flowing through the system. Such holders frequently consist of the conventional T-shaped fitting with the pipe system connected to the branches of the T. The remaining or third branch of the T, preferably one of the two aligned branches, is sealed and supports a thermometer or thermometer stem therein, which thermometer or thermometer stem preferably extends centrally into said third branch of the T-shaped holder and a sufficient distance into the remainder of the fitting to satisfactorily contact the material flowing through the passage formed by the remaining two branches of the fitting or holder. The mentioned central positioning of the thermometer or thermometer stem is desirable for reasons obvious to those familiar with the characteristics of the flow of fluid in a confining tube or pipe.

In many instances, it is desirable to provide means for supporting two or more thermometers or thermometer stems at a particular position or zone in a flow system, such as, for example, to provide holders for an indicating thermometer and a recording thermometer at a zone in which critical temperatures must be accurately determined. The obvious solution would at first appear to be to use a conventional cross-shaped type pipe fitting instead of the mentioned T-shaped pipe fitting to support such a pair of thermometer stems, in view of the fact that the cross-shaped type fitting apparently would provide the additional branch in which to support the second thermometer or thermometer stem. In view, however, of the fact that it is desirable to support such thermometers or thermometer stems centrally in the supporting branch of the fitting and in such fashion that the ends thereof extend through the central portion of the flow stream, it becomes immediately apparent that the suggested use of the conventional type of cross-shaped pipe fitting for holding the pair of thermometer stems, in which type of cross-shaped fitting all of the branches are in the same plane, would present difficult problems with regard to preventing the thermometer stems from contacting one another when mounted in operative position.

To solve such a problem, it may be suggested that the thermometer stems could readily be mounted in a slightly eccentric position within the branches of the mentioned cross-shaped type pipe fitting. In the event that no importance is attached to the central positioning of the thermometer stem, and in the event that such a thermometer holder need not be dismantled frequently for the purpose of cleaning, such a solution may be satisfactory in some instances, realizing, of course, that such an arrangement involves increased cost of manufacture. However, in such instances in which it is desired to have the thermometer stems mounted centrally of the flow stream and where it is desired and necessary to frequently dismantle the thermometers from the thermometer holder for the purpose of cleaning the thermometers and holder, as is necessary, for example, in the sanitary processing of food products, the mentioned use of a conventional type cross-shaped pipe fitting for a thermometer holder would not be acceptable. One of the chief objections to such an arrangement, as last mentioned above, is the possible contact of the stems of the thermometers one with another and the danger of damaging the stems of the thermometers during the assembling and disassembling of the thermometers in the thermometer holder.

In some instances such a conventional type cross-shaped fitting has been used as a holder for a pair of thermometers or thermometer stems by mounting each thermometer stem eccentrically within a cap for the end of the branch of the cross-shaped fitting in which the stem is to be housed. Such an arrangement, however, requires a careful installation of the thermometer stems mounted in the holder when the thermometer stems are supported in eccentric caps or closures, each time the thermometer stems are assembled into the holder. Obviously, when using a pair of thermometer stems in a cross-shaped fitting, they extend preferably not only into the zone of intercommunication of the various branches of the cross-shaped fitting but extend slightly through the supporting branch and into the aligned branch of such a fitting. It, therefore, becomes immediately apparent that in such an arrangement the stems of the thermometers would cross or overlap one another and it would be impossible to mount each of the stems centrally within its respective branch of the conventional type cross-shaped fitting. It becomes equally apparent that to mount each of the thermometer stems in an eccentric cap or closure for the outer end of a branch of the fitting would necessitate a very careful assembly of the thermometer stems in the fitting to prevent the contacting of the stems and the damaging of the stems during such contact.

The frequent assembly or disassembly of the thermometers or thermometer stems in the thermometer holder is a daily operation when used in connection with the sanitary processing of foodstuffs, for which type of operation the preferred embodiment of this invention has been particularly designed.

The objects of this invention are, therefore, to provide a thermometer holder; in which two or more thermometers or thermometer stems may be mounted in laterally spaced relation with respect to and out of contact with one another; in which the ends of each thermometer stem extend a satisfactory distance into the central portion of the flow stream of the material passing through the thermometer holder; in which the thermometer stems may be easily assembled and disassembled in the holder; in which each thermometer stem is supported centrally within its respective branch of the holder; and in which the ferrule elements associated with the thermometer stems are also used as the means for sealing the outer ends of the branches of the holder in which the thermometer stems are mounted and for supporting the stems in operative position within the holder.

Other important aspects of the invention will be apparent upon an examination of the drawings and the following detailed description of the invention and the appended claims, reference being made to the accompanying drawings in which:

Figure 3 is a sectional elevation taken longitudinally through the branch adapted to carry the male coupling element and being otherwise the type of fitting shown in Figure 2.

Figure 4 is a plan view of a modified thermometer holder according to applicant's invention associated with the adjacent ends of a pipe system, and carrying laterally spaced thermometers, and being provided with one enlarged branch for the holder.

Figure 1:
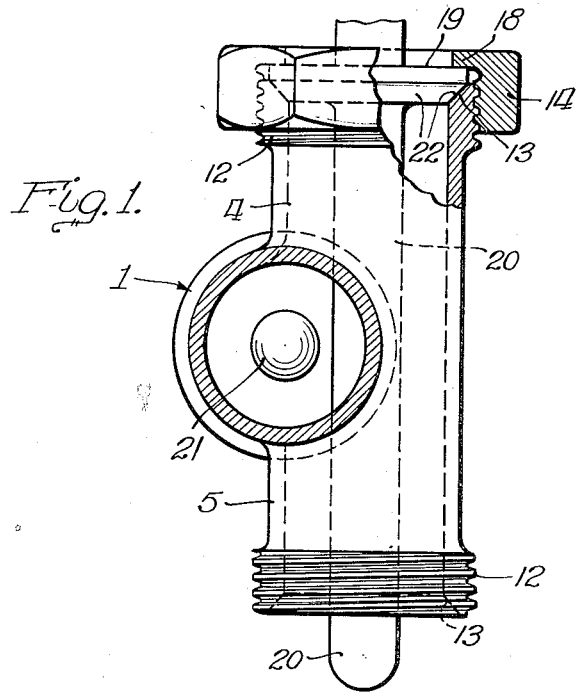
Figure 1 is a sectional elevation of a cross-shaped housing, constructed according to the preferred embodiment of applicant's invention with a portion of one branch shown in broken-away section.

Referring to the drawings illustrating the preferred embodiment of the invention, in which like numerals are associated with like elements, 1 represents generally the housing having two pairs of aligned branches. The first pair of aligned branches consists of branches 2 and 3 and the second pair of aligned branches consists of the branches 4 and 5. The axis of the aligned branches 2 and 3 is laterally spaced from the axis of the aligned branches 4 and 5. The aligned pairs of branches, as shown in Figure 4, consisting of the branches 2 and 3 as the first pair and the branches 4 and 5 as the second pair, are equipped with thermometer stems extending into the laterally spaced passages of the housing from one end of the passage through the zone 6 of the intercommunication of the passages and into the opposite end of the passage formed in each instance by the remaining branch of the pair of branches forming each of the two laterally spaced passages.

As clearly indicated in Figure 4 of the drawings, two of the outer ends of the laterally spaced passages, as represented by the branches 2 and 5 of the cross-shaped housing, are associated with the ends of a pipe system. The outer end of the branch 2, which in the preferred embodiment carries a male fitting 7, is coupled to the end of the pipe 8, by means of the coupling nut 9, threaded to the end of the pipe 8 and overlappingly engaging the flange of the male fitting 7. The male fitting or element 7 is soldered, sweated or otherwise suitably secured to the branch 2. The pipe 8 in the conventional manner is provided at its flanged end with a countersunk female element or shoulder 10, complementary to the outwardly beveled shoulder 11 on the male element 7. Similarly, the branch 5 of the housing 1 is provided at its outer end with outwardly extending screw threads 12 and a countersunk shoulder or female element 13, which is held in sealing engagement by the coupling nut 14 with the complementary beveled shoulder 15 of the male element 16 secured in the conventional manner to the adjacent end 17 of the pipe system, of which the housing 1 forms a part.

Figure 2:
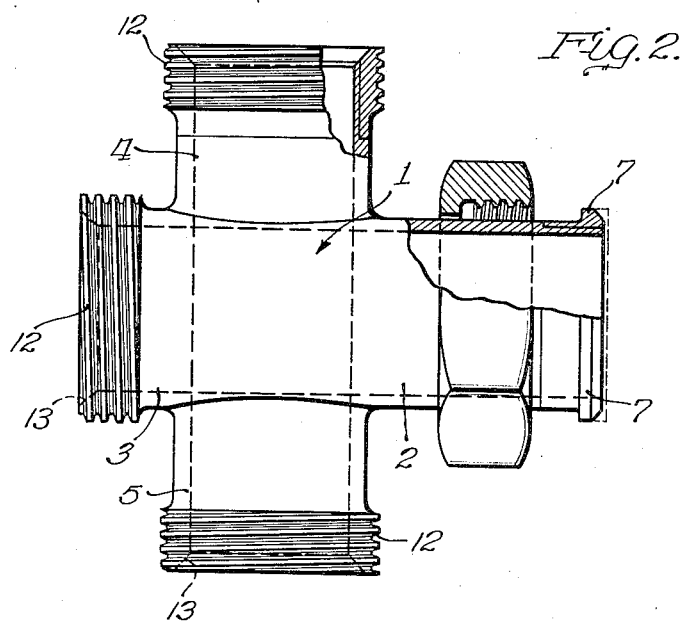
Figure 2 is a plan view of a cross-shaped housing according to applicant's invention, with a portion of one of the branches shown in broken-away section.

As illustrated in Figures 1 and 2 of the drawings, all of the branches of the housing 1 and the passages therethrough are of the same cross-sectional dimension. Referring, however, to Figure 4 of the drawings as compared with the remaining figures of the drawings, it should be noted that the coupling element at the outer end of the branch 5 and the diameter of the passage through the outer end of the branch 5 are of larger dimension than the coupling elements associated with the outer ends of the remaining branches of the housing 1, as well as the passages through the remaining branches of the housing 1. This feature is particularly desirable when it is expeditious to use the housing 1 to join the adjacent ends of the pipe system in which one portion of the pipe system is of a larger diameter than the other portion of the pipe system, as is the case in the illustration of Figure 4 of the drawings.

The remaining outer ends of the laterally spaced flow passages of the housing 1 are represented by the branches 3 and 4 of the housing 1. Each of the branches 3 and 4 is provided on its periphery at its outer end with the conventional type of screw threads 12 adapted to receive the conventional type of coupling nut 14, having an inwardly extending flange 18. The flanges 18 in each of these two instances overlap and compressively engage the outer face of the ferrules 19, carried by the thermometer stems or thermally sensitive controller or regulator actuating bulbs 20 and 21. The ferrules 19, which in the preferred arrangement of applicant's invention are integrally formed with the thermometer stems 20 and 21, in each instance also comprise the closure members or seals for the outer ends of the branches 3 and 4, as well as the means by which the thermometer stems 20 and 21 are centrally supported within the laterally spaced passages of the housing 1, of which the branches 3 and 4 form a part and are thus held in spaced relation with respect to one another.

In each instance, the ferrule 19 is provided on its inner surface with an outwardly beveled shoulder or male element 22, adapted to sealingly engage the complementary female element or inwardly beveled shoulder 13 on the outer end of each of the branches 3 and 4.

As will be apparent upon an inspection of the figures of the drawings in the light of the preceding comments, the present invention provides a new and novel type of thermometer housing, in which, according to the preferred embodiment of the invention, a pair of thermometer stems may be mounted in a single housing, centrally positioned within the flow stream passing through the pipe system, of which the housing forms a part, and securely held in laterally spaced relation with respect to one another by the use of elements relatively inexpensive to construct, and easy to assemble and disassemble. The new and novel thermometer holder also provides an improved device for supporting thermometers in a pipe system or the like, in which the ever-present danger of damaging the sensitive thermometer stems has been substantially eliminated.

The preferred embodiment of the invention in an improved housing for thermometer stems or bulbs for regulators or controllers is described above for the purpose of illustration only. Obviously, various modifications may become apparent to those skilled in the art, and the following claims should be read, having in mind the applicant's generic use of the terms "thermometer stems," "thermometer holders," and "thermometer bulbs" as including such like devices as holders for other sensitive regulator or controller or indicator actuating devices. Ready suggestible modifications may consist in providing different arrangements for coupling elements at the outer ends of the branches of the housing or in providing additional laterally spaced branches, the inner ends of all of which communicate one with another at the zone of intercommunication of the housing in the same general manner as illustrated in the drawings. Such suggestions or modifications do, however, not depart from the scope of the present invention as described above and as again set forth in the appended claim.

The invention is hereby claimed as follows:

A device of the class described, comprising, in combination, a hollow cross-shaped housing having laterally spaced passages intercommunicating intermediate their ends, each of said passages being formed in aligned branches of said cross-shaped housing and both passages intercommunicating at the zone of juncture of the branches of said housing, an inwardly beveled seat in the outer end of each of two circumferentially adjacent branches of said housing, a separate thermometer stem centrally housed in each of said passages, separate ferrule means associated with each of said thermometer stems, each of said ferrule means being provided with a beveled shoulder complementary to the inwardly beveled seat in the branch of said housing with which it is associated, and compression means for securing each of said ferrule means to the ends of said branches with which said ferrule means are associated, said thermometer stems extending into said branches at least to said zone of juncture.

JAMES A. WILDERMUTH.

REFERENCES CITED

The following references are of record in the file of this patent:

UNITED STATES PATENTS

| Number | Name | Date |
|---|---|---|
| 550,814 | Barrus | Dec. 3, 1895 |
| 1,609,606 | Clawson | Dec. 7, 1926 |
| 1,747,514 | Kennedy | Feb. 18, 1930 |
| 2,250,320 | Young | July 22, 1941 |
| 2,338,090 | Bradfield | Jan. 4, 1944 |
| 2,432,224 | Bradfield | Dec. 9, 1947 |

FOREIGN PATENTS

| Number | Country | Date |
|---|---|---|
| 399,860 | France | May 7, 1909 |